(12) United States Patent
Divakar et al.

(10) Patent No.: US 9,794,230 B2
(45) Date of Patent: Oct. 17, 2017

(54) METHOD AND SYSTEM FOR ENCRYPTING MULTIMEDIA STREAMS

(71) Applicant: ITTIAM SYSTEMS (P) LTD., Bangalore (IN)

(72) Inventors: Pavan Divakar, Bangalore (IN); Rakshith Shantharaju, Bangalore (IN); Shashank Hegde, Bangalore (IN); Bhavani Gopalakrishna Rao, Bangalore (IN); Abhinandan Kedlaya, Bangalore (IN); Puneet Gupta, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 115 days.

(21) Appl. No.: 14/335,880

(22) Filed: Jul. 19, 2014

(65) Prior Publication Data

US 2015/0026459 A1   Jan. 22, 2015

(30) Foreign Application Priority Data

Jul. 20, 2013 (IN) .......................... 3239/CHE/2013

(51) Int. Cl.
*H04L 29/06* (2006.01)
*H04N 21/2347* (2011.01)
*H04N 21/835* (2011.01)

(52) U.S. Cl.
CPC ........ *H04L 63/0428* (2013.01); *H04L 63/062* (2013.01); *H04N 21/23476* (2013.01); *H04N 21/835* (2013.01)

(58) Field of Classification Search
CPC ... H04L 63/0428; H04L 63/164; H04L 63/12; H04L 63/08; G06F 21/6218
USPC ........................................................ 713/160
See application file for complete search history.

(56) References Cited

U.S. PATENT DOCUMENTS

| | | | |
|---|---|---|---|
| 5,548,648 A * | 8/1996 | Yorke-Smith | H04L 9/0869 380/29 |
| 5,581,614 A * | 12/1996 | Ng et al. | 380/239 |
| 7,376,831 B2 * | 5/2008 | Kollmyer et al. | 713/154 |
| 7,434,052 B1 * | 10/2008 | Rump | 713/171 |
| 7,684,566 B2 * | 3/2010 | Oliveira et al. | 380/212 |
| 7,830,969 B2 * | 11/2010 | Wee et al. | 375/240.29 |
| 8,281,128 B2 * | 10/2012 | Lee | H04N 7/1675 380/42 |
| 2002/0018565 A1 * | 2/2002 | Luttrell et al. | 380/217 |
| 2007/0154018 A1 * | 7/2007 | Watanabe | H04L 63/0428 380/273 |
| 2007/0237144 A1 * | 10/2007 | Adhikari et al. | 370/392 |
| 2009/0169000 A1 * | 7/2009 | Shintani | H04L 9/00 380/210 |

(Continued)

*Primary Examiner* — Ali Abyaneh
(74) *Attorney, Agent, or Firm* — Prakash Nama; Global IP Services, PLLC

(57) ABSTRACT

A method and system for encrypting data packets in a multimedia stream are disclosed. Each data packet includes a header portion and a payload portion. In one embodiment, one or more data packets are selected from an incoming multimedia stream. Further, one or more of a header portion and a payload portion are selected within the one or more data packets. Furthermore, one or more regions in the selected one or more of the header portion and the payload portion are encrypted using an encryption algorithm.

26 Claims, 6 Drawing Sheets

(56) References Cited

U.S. PATENT DOCUMENTS

| | | | |
|---|---|---|---|
| 2011/0119480 A1* | 5/2011 | Massoudi et al. | 713/150 |
| 2012/0063595 A1* | 3/2012 | Massoudi | H04N 7/1675 |
| | | | 380/210 |

* cited by examiner

METHOD AND SYSTEM FOR ENCRYPTING MULTIMEDIA STREAMS

Benefit is claimed under 35 U.S.C. 119(a) to Indian Provisional Patent Application Ser. No 3239/CHE/2013 entitled "SYSTEM AND METHOD FOR ENCRYPTION AND USAGE OF ENCRYPTED TRANSPORT STREAMS" by ITTIAM SYSTEMS (P) LTD. filed on Jul. 20, 2013.

FIELD OF TECHNOLOGY

The present invention relates in general to multimedia streams and more particularly, to method and system for encrypting multimedia streams.

BACKGROUND

Security of multimedia content is an important aspect in several applications, like broadcasting of live videos, defense videos, healthcare videos, etc. For example, the multimedia content includes video, audio, closed captions, metadata and the like. As such, the multimedia content is typically secured by encapsulating the multimedia content in an encrypted multimedia stream.

Existing techniques may encrypt the entire multimedia stream to secure the multimedia content. Such encryption techniques are computationally intensive not just while encrypting but also while decrypting. Further, during playback, operations such as seek, fast forward and rewind may be affected.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for encrypting multimedia streams are disclosed. In the following detailed description of the embodiments of the invention, references are made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide methods and systems for encrypting multimedia streams. The example technique disclosed herein provides a multimedia stream encryption engine, in a transmitting unit, for securing multimedia content in the multimedia streams to prevent unauthorized personnel from utilizing the content. For example, the multimedia stream includes audio content, video content, images, closed captions, metadata and the like. The multimedia stream encryption engine selects one or more data packets from the multimedia stream. Further, the multimedia stream encryption engine encrypts one or more regions within the selected data packets using encryption algorithms. In addition, the multimedia stream encryption engine embeds encryption information into the multimedia stream to enable decryption by the multimedia stream decryption engine.

Figure 1:
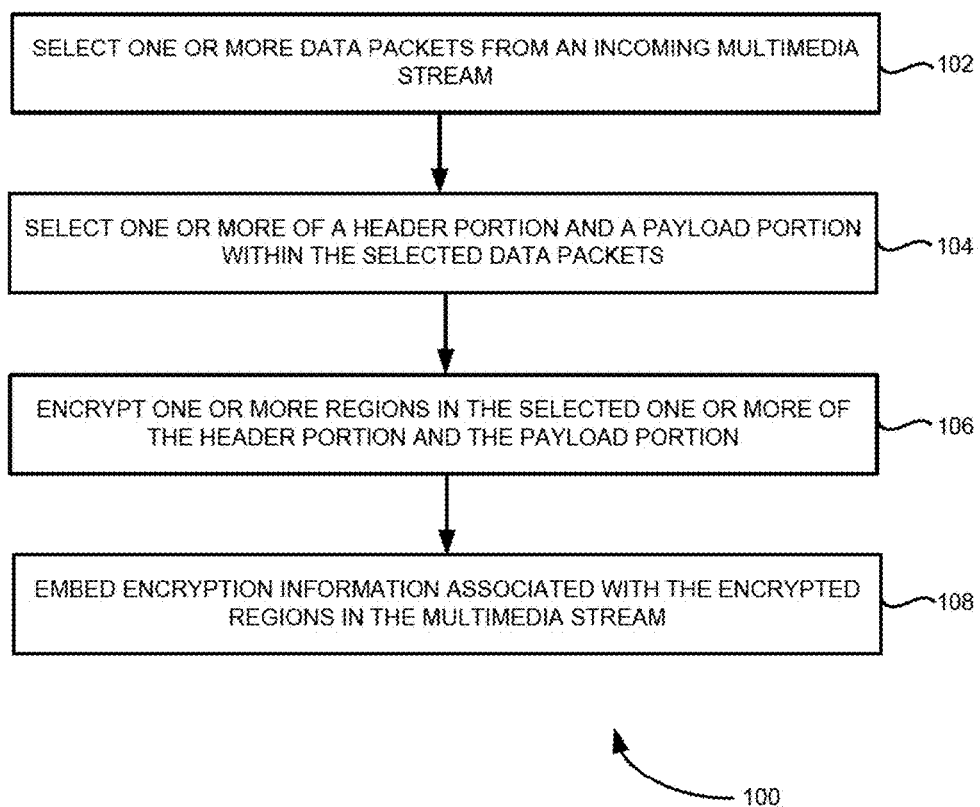
FIG. 1 illustrates a flow chart of an exemplary method for encrypting data packets in a multimedia stream, according to one embodiment.

Referring now to FIG. 1, which illustrates a flow chart 100 of an exemplary method for encrypting data packets in a multimedia stream, according to one embodiment. Each data packet includes a header portion and a payload portion. For example, a data packet includes a video packet, an audio packet, a closed caption data packet, an image packet, a metadata packet and the like. At block 102, one or more data packets are selected from an incoming multimedia stream. At block 104, one or more of a header portion and a payload portion are selected within the selected data packets. At block 106, one or more regions in the selected one or more of the header portion and the payload portion within the data packets are encrypted using an encryption algorithm (e.g., a symmetric encryption algorithm). In one example embodiment, one or more regions in the header portion within the data packets are encrypted. In this example embodiment, the payload portion within the data packets remains unencrypted. In another example embodiment, one or more regions in the payload portion within the data packets are encrypted, such that the data packets cannot be utilized using unencrypted regions in the associated payload portion. In other words, no meaningful information can be extracted from the unencrypted regions in the payload portion of the data packets. In these embodiments, the one or more data packets are encrypted using same or different encryption algorithms. Further, the one or more data packets are encrypted using same or different encryption keys.

At block 108, encryption information associated with the encrypted regions is embedded in the multimedia stream for transmission to a receiving unit. For example, the encryption information includes information of the selected portions, start of the encrypted regions, size of the encrypted regions, the encryption algorithm and/or key information (KI) associated with encryption keys used to encrypt the regions. In one example embodiment, a custom stream is added to the multimedia stream. The encryption information associated with the data packets is then embedded in packets associated with the custom stream. In one example, the packets associated with the custom stream are added before each of the one or more data packets. The process of encrypting the data packets in the multimedia stream is explained in more detail with reference to FIGS. 2-4.

Figure 2:
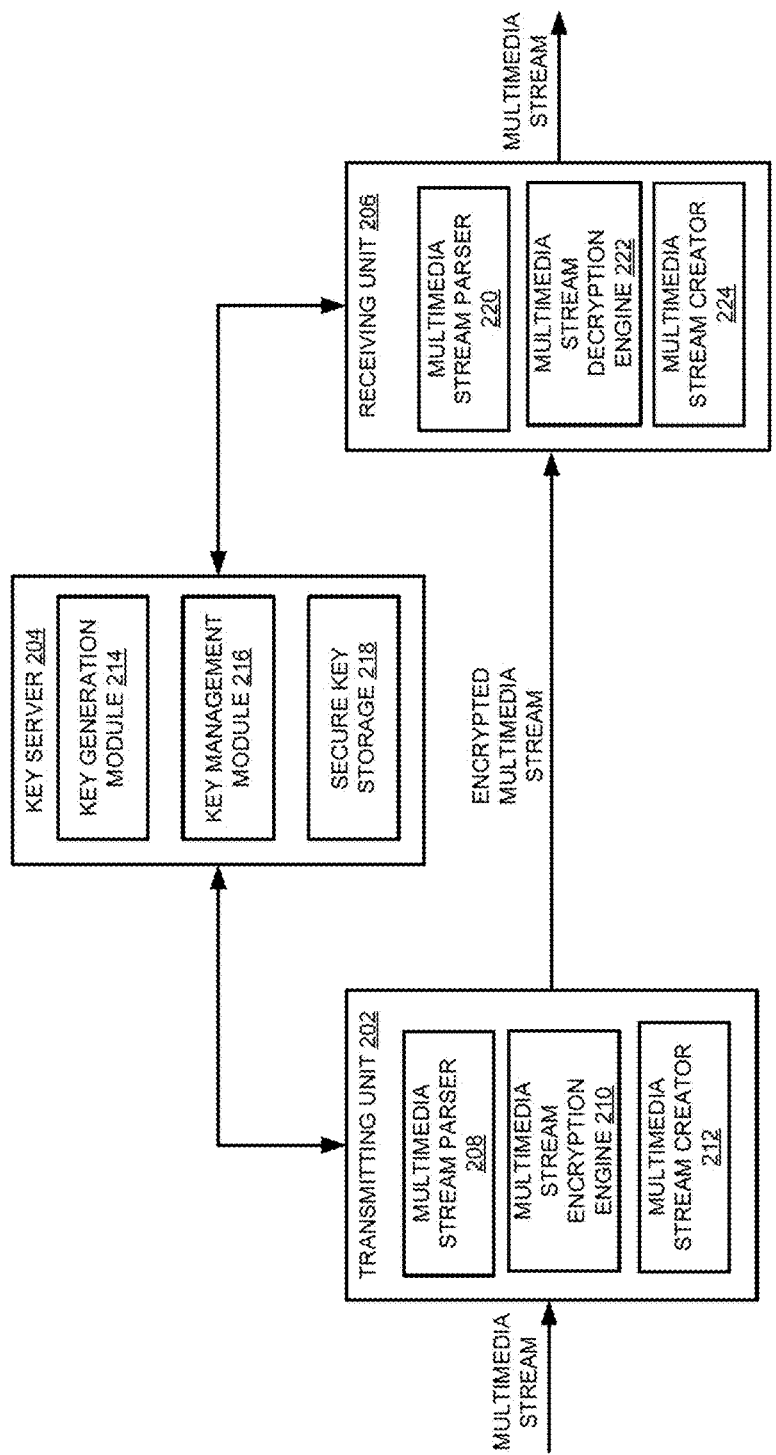
FIG. 2 illustrates an exemplary system for encrypting multimedia streams along with key management and decryption of the multimedia streams, according to one embodiment.

Referring now to FIG. 2, which illustrates an exemplary system 200 for encrypting multimedia streams along with key management and decryption of the multimedia streams, according to one embodiment. As shown in FIG. 2, the system 200 includes a transmitting unit 202, a key server 204 and a receiving unit 206. For example, the transmitting unit 202 can be at a headend of a content provider and the receiving unit 206 can be in any playback device, such as a set-top box. In the example illustrated in FIG. 2, the key server 204 is a central server that generates, manages and stores encryption keys. For example, the transmitting unit 202 and the receiving unit 206 may be connected to one or more key servers (also referred to as decentralized key servers) located in their vicinity.

Further as shown in FIG. 2, the transmitting unit 202 includes a multimedia stream parser 208, a multimedia stream encryption engine 210, and a multimedia stream creator 212. Furthermore as shown in FIG. 2, the key server 204 includes a key generation module 214, a key management module 216 and a secure key storage 218. In addition as shown in FIG. 2, the receiving unit 206 includes a multimedia stream parser 220, a multimedia stream decryption engine 222 and a multimedia stream creator 224. Moreover as shown in FIG. 2, the transmitting unit 202 and the receiving unit 206 are communicatively connected to the key server 204 via secure connections.

In operation, the transmitting unit 202 obtains a multimedia stream to be encrypted. In one example, the multimedia stream includes video, audio, images, closed captions, and associated metadata. For example, the multimedia stream may need to be encrypted for applications, such as on-demand streaming, storage and so on. For example, the multimedia stream may include a moving pictures experts group-2 (MPEG-2) transport streams, MPEG-2 program streams, base media file formats (e.g., MPEG Layer-4 (MP4) third generation partnership project (3GPP)) and the like.

Further in operation, the multimedia stream parser 208 parses the obtained multimedia stream to identify one or more data packets in the multimedia stream. Each packet includes a header portion and a payload portion. Exemplary data packets include a video packet, an audio packet, a closed caption data packet, an image packet, a metadata packet and the like. Furthermore, the multimedia stream parser 208 sends the parsed multimedia stream to the multimedia stream encryption engine 210. The multimedia stream encryption engine 210 represents any combination of circuitry and executable instructions to encrypt the multimedia stream.

In one embodiment, the multimedia stream encryption engine 210 selects one or more data packets from the parsed multimedia stream. Further, the multimedia stream encryption engine 210 selects one or more portions (e.g., header portion and/or payload portion) within the selected data packets.

Furthermore, the multimedia stream encryption engine 210 obtains one or more encryption keys from the key server 204. In one example embodiment, the multimedia stream encryption engine 210 connects to the key server 204 through secure connections, like transport layer security (TLS). Further, the key server 204 authenticates the multimedia stream encryption engine 210 using authentication information. Upon authentication of the multimedia stream encryption engine 210, the key generation module 214 generates encryption keys and key information (KI) associated with the generated encryption keys. The KI includes an ID for the generated encryption keys. In addition, the secure key storage 218 stores the encryption keys and the associated KI. Moreover, the key management module 216 sends the encryption keys and the associated KI to the multimedia stream encryption engine 210.

Figure 4:
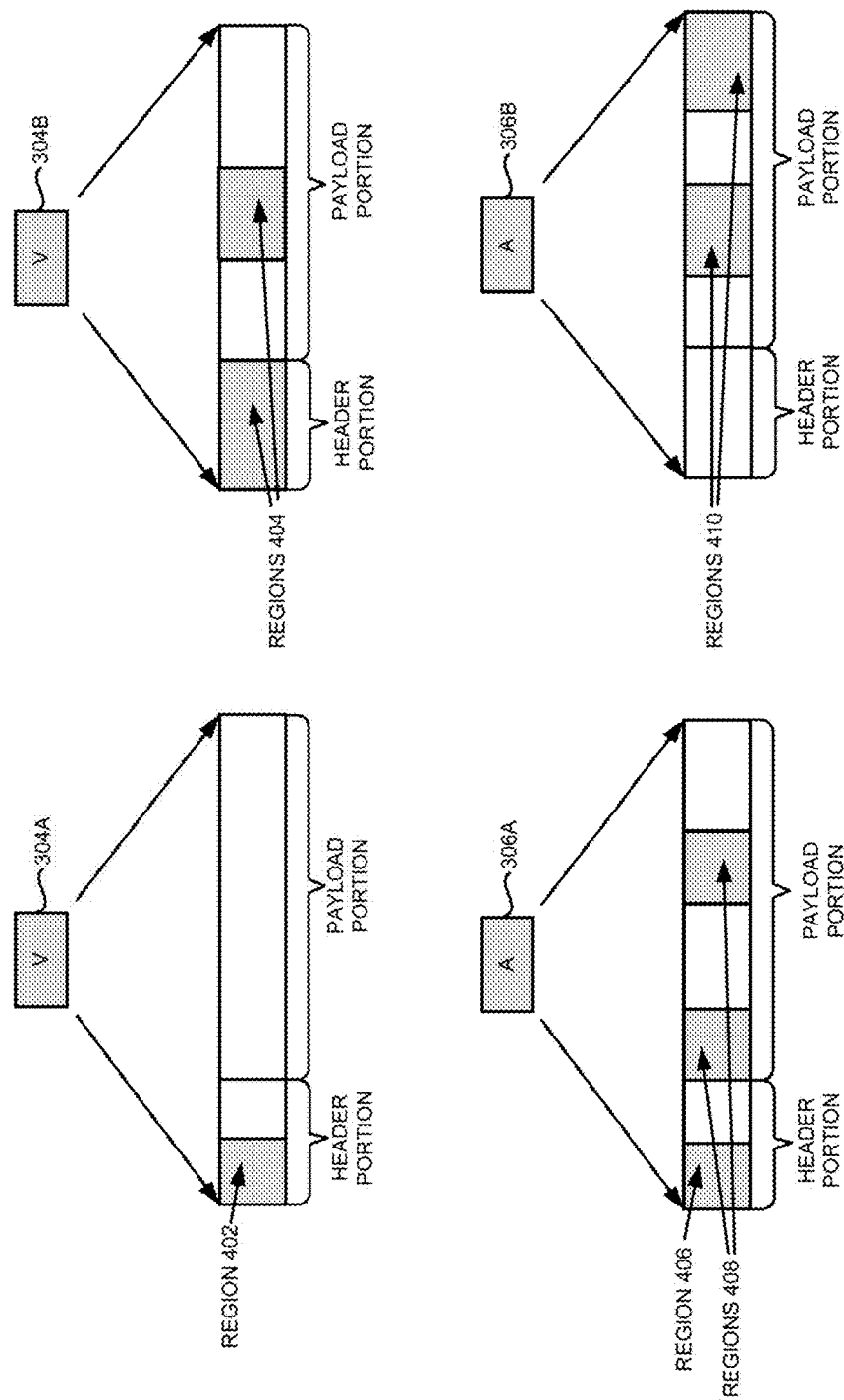
FIG. 4 illustrates one or more encrypted regions within data packets in the multimedia stream, according to one embodiment.

Further, the multimedia stream encryption engine 210 encrypts one or more regions (as shown in FIG. 4) in the selected portions using the encryption keys. In other words, the multimedia stream encryption engine 210 randomly selects one or more regions within the selected portions for encrypting using the encryption keys. For example, a region represents at least a part of a header portion or a payload portion. For example, the multimedia stream encryption engine 210 encrypts the one or more regions using an encryption algorithm. Exemplary encryption algorithm includes symmetric encryption algorithm, such as advanced encryption standard (AES), triple data encryption algorithm (3DES), TwoFish and the like. In one example implementation, the one or more data packets may be encrypted using the same encryption key or different encryption keys. In another example implementation, the one or more data packets may be encrypted using the same encryption algorithm or different encryption algorithms.

Figure 3:
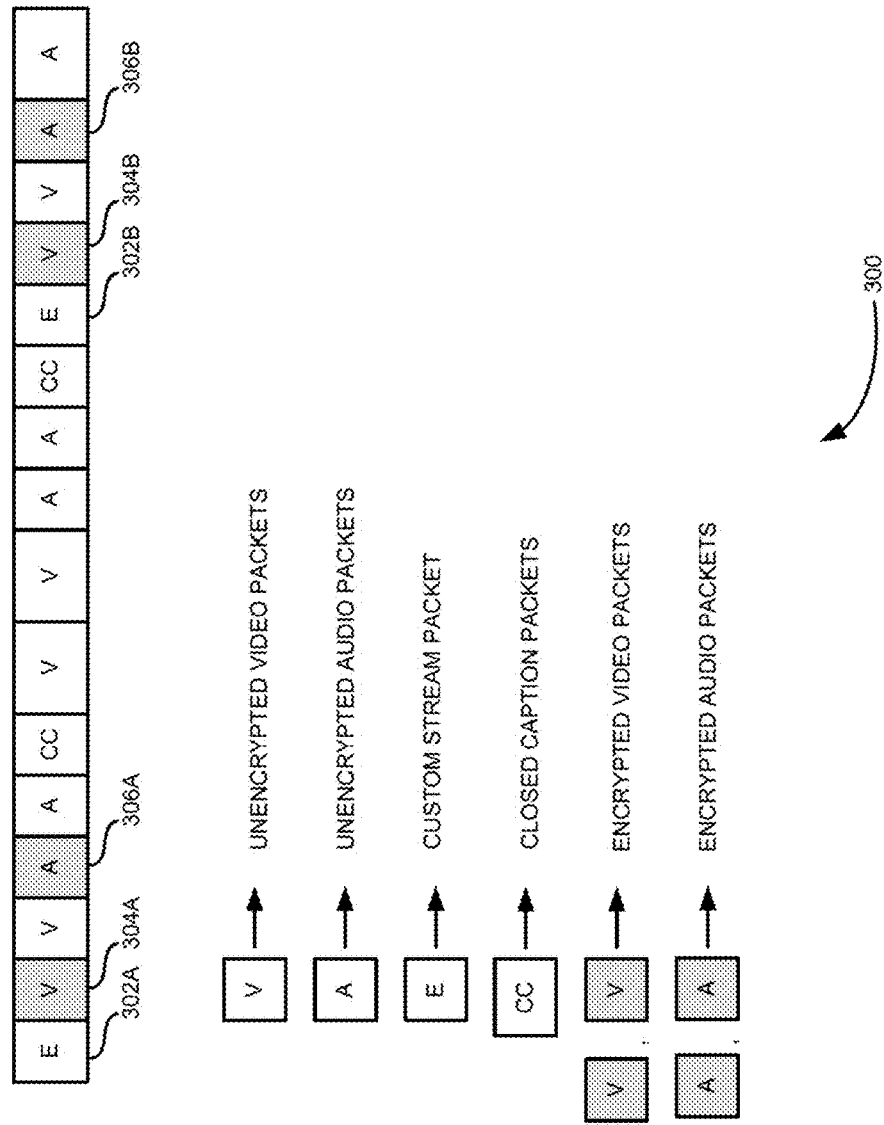
FIG. 3 illustrates an exemplary encrypted multimedia stream, according to one embodiment.

Furthermore, the multimedia stream encryption engine 210 optionally modifies the header portion of each of the encrypted data packets to indicate that one or more portions in the data packet are encrypted. In addition, the multimedia stream encryption engine 210 embeds encryption information associated with the one or more data packets in the multimedia stream, as shown in FIG. 3. For example, the encryption information includes information of the selected portions, start of the encrypted regions in the selected portions, size of the encrypted regions, an encryption algorithm and/or KI associated with the encryption keys used to encrypt the regions. This is explained in detail with reference to FIG. 5.

In one example embodiment, the multimedia stream encryption engine 210 adds a custom stream to the multimedia stream. For example, the custom stream is an additional stream added to the multimedia stream for carrying encryption information and the packets associated with the custom stream are referred to as custom stream packets. Further, the multimedia stream encryption engine 210 embeds encryption information associated with the one or more data packets into the custom stream packets. In one example, the custom stream packets are added before each of the encrypted data packets. Adding the custom stream packets before each of the encrypted data packets enables the multimedia stream decryption engine 222 to identify the encrypted data packets during decryption. Further in this embodiment, the multimedia stream encryption engine 210 updates track tables (e.g., program association table (PAT) and/or program mapping table (PMT) in case of transport stream, movie boxes in case of the base media file formats and the like) associated with the multimedia stream with an ID associated with the custom stream.

Also, the multimedia stream encryption engine 210 embeds the custom stream packets at regular intervals to indicate the encryption algorithm used and the KI associated with the encryption keys used. Moreover, the custom stream packets may also include a flag to indicate a random access point in the multimedia stream. Further, the multimedia stream creator 212 sends encrypted multimedia stream to the receiving unit 206. The encrypted multimedia stream includes the encrypted data packets along with the encryption information and unencrypted data packets, as shown in FIG. 3. In one example, the multimedia stream creator 212 creates a multimedia stream for sending to the receiving unit 206.

In one example embodiment, in the receiving unit 206, the multimedia stream parser 220 parses the obtained encrypted multimedia stream to retrieve KI from the encryption information. The multimedia stream decryption engine 222 sends the retrieved KI to the key server 204 to obtain the encryption keys. In one example, the key server 204 authenticates the multimedia stream decryption engine 222 and then sends the encryption keys. Further, the multimedia stream decryption engine decrypts the encrypted packets in the multimedia stream using the encryption keys and the encryption information. The multimedia stream decryption engine 222 represents any combination of circuitry and executable instructions to decrypt the multimedia stream. In addition, the multimedia stream creator 224 creates a multimedia stream using the decrypted data packets.

In one example scenario, during playback, trick modes, such as rewind, fast forward, seek and the like are performed using the flags in the custom stream packets which indicates the random access point in the multimedia stream.

Referring now to FIG. 3, which illustrates an exemplary encrypted multimedia stream 300, according to one embodiment. As shown in FIG. 3, the encrypted multimedia stream 300 includes custom stream packets 302A and 302B, encrypted video packets 304A and 304B, encrypted audio packets 306A and 306B and unencrypted audio, video and closed caption packets. For example, the custom stream packets 302A and 302B are packets associated with a custom stream which includes the encryption information. This is explained in detail with reference to FIG. 2.

In the example illustrated in FIG. 3, the custom stream packet 302A includes encryption information associated with the encrypted video packets 304A and the encrypted audio packets 306A. Further, the custom stream packet 302B includes encryption information associated with the encrypted video packets 304B and the encrypted audio packets 306B. One or more encrypted regions within each of the encrypted video packets 304A and 304B and the encrypted audio packets 306A and 306B are illustrated in FIG. 4. For example, one or more regions within each of the encrypted video packets 304A and 304B may be encrypted using different encryption algorithms and/or different encryption keys. Similarly, one or more regions within each of the encrypted audio packets 306A and 306B may be encrypted using different encryption algorithms and/or different encryption keys.

Referring now to FIG. 4, which illustrates the one or more encrypted regions within the data packets in the multimedia stream 300, shown in FIG. 3, according to one embodiment. Particularly, FIG. 4 illustrates encrypted regions within the encrypted video packets 304A and 304B, the encrypted audio packets 306A and 306B, shown in FIG. 3. As shown in FIG. 4, a region 402 within a header portion of the encrypted video packet 304A is encrypted and a payload portion of the encrypted video packet 304A is unencrypted. Further as shown in FIG. 4, regions 404 including complete header portion and a region in a payload portion are encrypted in the encrypted video packet 304B. Furthermore as shown in FIG. 4, a region 406 in a header portion and regions 408 in a payload portion are encrypted in the encrypted audio packet 306A. In addition as shown in FIG. 4, regions 410 in a payload portion of the encrypted audio packet 306B are encrypted and a header portion of the encrypted audio packet 306B is unencrypted.

Figure 5:
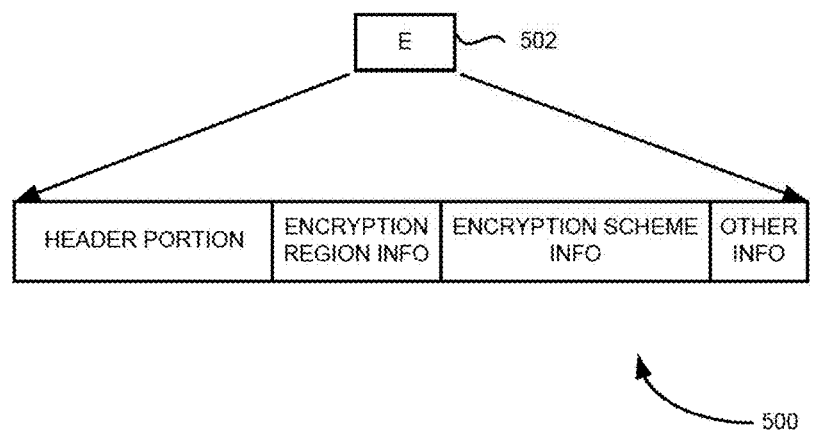
FIG. 5 illustrates various fields within a custom stream packet including encryption information, according to one embodiment.

Referring now to FIG. 5, which illustrates various fields within a custom stream packet 502 including the encryption information, according to one embodiment. The custom stream packet 502 is similar to the custom stream packets 302A and 302B, shown in FIG. 3. As shown in FIG. 5, the custom stream packet 502 includes a header portion, encryption region information, encryption scheme information and other information. The format of the header portion of the custom stream packet 502 is based on the format (e.g., MPEG-2 transport stream, base media file formats and the like) of the multimedia stream. The encryption region information includes the information associated with the one or more encrypted regions in the data packets. The encryption scheme information includes the encryption algorithm used to encrypt the one or more data packets. The other information includes the KI associated with the encryption keys and a flag for indicating a random access point.

Figure 6:
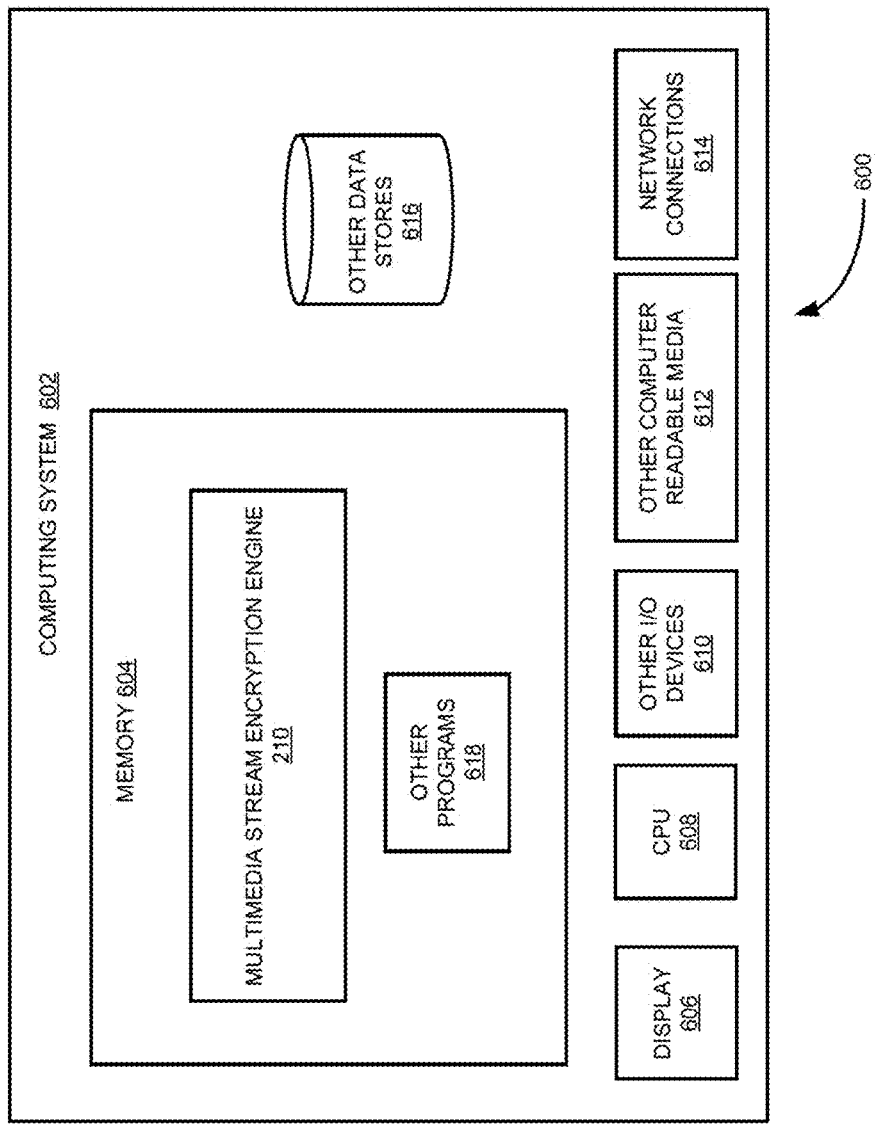
FIG. 6 is a block diagram of an exemplary physical computing system for implementing encryption engine, according to one embodiment.

Referring now to FIG. 6, which is a block diagram 600 of an exemplary physical computing system 502 for implementing the multimedia stream encryption engine 210, according to one embodiment. In particular, FIG. 6 shows the computing system 602 that may be utilized to implement the multimedia stream encryption engine 210. Note that one or more general purpose virtual or physical computer systems suitably instructed may be used to implement the multimedia stream encryption engine 210. In addition, computing system 602 may comprise one or more distinct computing systems/devices and may span distributed locations.

In the embodiment shown, computing system 602 may comprise computer memory ("memory") 604, display 606, one or more CPUs 608, input/output devices 610 (e.g., keyboard, mouse, etc.), other computer-readable media 612, and network connections 614. The multimedia stream encryption engine 210 is shown residing in memory 604. The components of the multimedia stream encryption engine 210 may execute on one or more CPUs 608 and implement techniques described herein. Other code or programs 618 (e.g., an administrative interface, a Web server, and the like) may also reside in memory 604, and execute on one or more CPUs 608. Further, other data repositories, such as data store 616, may also reside in computing system 602. One or more of the components in FIG. 6 may not be present in any specific implementation. For example, some embodiments may not provide other computer readable media 612 and/or display 606.

The multimedia stream encryption engine 210 interacts via a communication network with key server 204. The communication network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of the multimedia stream encryption engine 210, such as in data store 616, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of the multimedia stream encryption engine 210 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some of all of the system components and/or data structures may also be stored as contents (e.g., as executable or other machine-readable software instructions or structured data) on a non-transitory computer-readable medium (e.g., as a hard disk; a memory; or a portable media article to be read by an appropriate drive or via an appropriate connection, such as a DVD or flash memory device) so to enable or configure the computer-readable medium and/or one or more associated computing systems or devices to execute or otherwise use or provide the contents to perform at least some of the described techniques, Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The methods and systems described herein enable secure generation of encryption keys during encryption, decryption and playback processes. Further, the methods and systems provide a scalable encryption technique with different levels of computational complexity based on application. Furthermore, the methods and systems enable random access of content in a multimedia stream without having to decrypt the entire multimedia stream.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for encrypting data packets in a multimedia stream, each data packet comprising a header portion and a payload portion, the method comprising:
   selecting one or more data packets from an incoming multimedia stream;
   selecting a header portion and a payload portion associated with each of the one or more selected data packets;
   encrypting a part of the selected header portion and a part of the selected payload portion associated with each of the one or more selected data packets using an encryption algorithm, wherein remaining part of the selected header portion and remaining part of the selected payload portion associated with each of the one or more selected data packets remain unencrypted; and
   embedding encryption information associated with the encrypted part of the header portion and the payload portion in the multimedia stream to enable decryption by a receiving unit, wherein the encryption information comprises start of the encrypted part of the selected header portion and the selected payload portion, size of the encrypted part of the selected header portion and the selected payload portion, and an encryption algorithm and key information (KI) associated with encryption keys used to encrypt the part of the selected header portion and the selected payload portion.

2. The method of claim 1, wherein encrypting the part of the selected header portion and the part of the selected payload portion using the encryption algorithm comprises:
   encrypting the part of the header portion within each of the one or more selected data packets; and
   encrypting the part of the payload portion within each of the one or more selected data packets, such that the one or more data packets cannot be utilized using unencrypted regions in the associated payload portion.

3. The method of claim 1, wherein embedding the encryption information associated with the encrypted part of the header portion and the encrypted pan of the payload portion in the multimedia stream comprises:
   adding a custom stream to the multimedia stream; and
   embedding the encryption information associated with the encrypted part of the header portion and the encrypted part of the payload portion in packets associated with the custom stream.

4. The method of claim 3, wherein the packets associated with the custom stream are added before each of the selected one or more data packets.

5. The method of claim 1, wherein the one or more data packets are selected from the group consisting of a video packet, an audio packet, a closed caption data packet, an image packet and a metadata packet.

6. The method of claim 1, wherein the encryption algorithm comprises a symmetric encryption algorithm.

7. The method of claim 1, wherein the part of the header portion and the part of the payload portion in each of the one or more selected data packets is encrypted using same or different encryption keys.

8. The method of claim 1, wherein the part of the header portion and the part of the payload portion in each of the one or more selected data packets is encrypted using same or different encryption algorithms.

9. The method of claim 1, further comprising modifying the header portion of each of the one or more selected data packets to indicate that one or more portions in each data packet are encrypted.

10. A system for encrypting data packets in a multimedia stream, each data packet comprising a header portion and a payload portion, the system comprising:
    a key server; and
    a transmitting unit communicatively connected to the key server; wherein the transmitting unit comprises a processor, memory coupled to the processor, and a multimedia stream encryption engine stored in the memory and executed using the processor to:
    select one or more data packets from an incoming multimedia stream;
    select a header portion and a payload portion associated with each of the one or more selected data packets;
    obtain one or more encryption keys from the key server;
    encrypt a part of the selected header portion and a part of the selected payload portion associated with each of the one or more selected data packets using the one or more encryption keys, wherein remaining part of the selected header portion and remaining part of the selected payload portion associated with each of the one or more selected data packets remain unencrypted; and embed encryption information associated with the encrypted part of the header portion and the payload portion in the multimedia stream to enable decryption by a receiving unit, wherein the encryption information comprises start of the encrypted part of the selected header portion and the selected payload portion, size of the encrypted part of the selected header portion and the selected payload portion, and an encryption algorithm and key information (KI) associated with encryption keys used to encrypt the part of the selected header portion and the selected payload portion.

11. The system of claim 10, wherein the multimedia stream encryption engine is configured to perform:
encrypting the part of the header portion within each of the one or more selected data packets; and
encrypting the part of the payload portion within each of the one or more selected data packets, such that the one or more data packets cannot be utilized using unencrypted regions in the associated payload portion.

12. The system of claim 10, wherein the multimedia stream encryption engine is configured to:
add a custom stream to the multimedia stream; and
embed the encryption information associated with the encrypted part of the header portion and the part of the payload portion in packets associated with the custom stream.

13. The system of claim 12, wherein the packets associated with the custom stream are added before each of the selected one or more data packets.

14. The system of claim 10, wherein the key server comprises a key generation module to:
generate the one or more encryption keys for each of the one or more selected data packets.

15. The system of claim 10, wherein the one or more data packets are selected from the group consisting of a video packet, an audio packet, a closed caption data packet, an image packet and a metadata packet.

16. The system of claim 10, wherein the multimedia stream encryption engine to modify the header portion of each of the one or more selected data packets to indicate that one or more portions in each data packet are encrypted.

17. A non-transitory computer-readable storage medium including instructions executable by a computing device to:
select one or more data packets from an incoming multimedia stream;
select a header portion and a payload portion associated with each of the one or more selected data packets;
encrypt a part of the selected header portion and a part of the selected payload portion associated with each of the one or more selected data packets, using an encryption algorithm, wherein remaining part of the selected header portion and remaining part of the selected payload portion associated with each of the one or more selected data packets remain unencrypted; and
embed encryption information associated with the encrypted part of the header portion and the payload portion in the multimedia stream to enable decryption by a receiving unit, wherein the encryption information comprises start of the encrypted part of the selected header portion and the selected payload portion, size of the encrypted part of the selected header portion and the selected payload portion, and an encryption algorithm and key information (KI) associated with encryption keys used to encrypt the part of the selected header portion and the selected payload portion.

18. The non-transitory computer-readable storage medium of claim 17, wherein encrypting the part of selected header portion and the selected payload portion using the encryption algorithm comprises:
encrypting the part of the header portion within each of the one or more selected data packets; and
encrypting the part of the payload portion within each of the one or more selected data packets, such that the one or more data packets cannot be utilized using unencrypted regions in the associated payload portion.

19. The non-transitory computer-readable storage medium of claim 17, wherein embedding the encryption information associated with the encrypted part of the header portion and the part of the payload portion in the multimedia stream comprises:
adding a custom stream to the multimedia stream; and
embedding the encryption information associated with the encrypted part of the header portion and the encrypted part of the payload portion in packets associated with the custom stream.

20. The non-transitory computer-readable storage medium of claim 19, wherein the packets associated with the custom stream are added before each of the selected one or more data packets.

21. The non-transitory computer-readable storage medium of claim 17, wherein the one or more data packets are selected from the group consisting of a video packet, an audio packet, a closed caption data packet, an image packet and a metadata packet.

22. The non-transitory computer-readable storage medium of claim 17, wherein the encryption algorithm comprises a symmetric encryption algorithm.

23. A method for encrypting data packets in a multimedia stream, each data packet comprising a header portion and a payload portion, the method comprising:
selecting one or more data packets from an incoming multimedia stream;
selecting a header portion and/or a payload portion associated with each of the one or more selected data packets;
encrypting a part of the selected header portion and/or a part of the selected payload portion associated with each of the one or more selected data packets using an encryption algorithm; and
embedding encryption information associated with the encrypted part of the header portion and/or the payload portion in the multimedia stream to enable decryption by a receiving unit, wherein the encryption information comprises start of the encrypted part of the selected header portion and/or the selected payload portion, size of the encrypted part of the selected header portion and/or the selected payload portion, and an encryption algorithm and key information (KI) associated with encryption keys used to encrypt the part of the selected header portion and/or the selected payload portion, wherein embedding the encryption information comprises:
adding a custom stream to the multimedia stream, wherein adding the custom stream to the multimedia stream comprises:
embedding the packets associated with the custom stream at regular intervals to indicate the usage of encryption algorithm and the usage of KI associated with the encryption keys, and wherein each packet associated with the custom stream include a flag to indicate a random access point in the multimedia stream; and embedding the encryption information associated with the encrypted part of the header portion and/or the encrypted part of the payload portion in packets associated with the custom stream.

24. The method of claim 23, wherein each flag in the packets associated with the custom stream is used to perform trick mode operations during playback, wherein the trick mode operations are selected from the group consisting of seek, fast forward, and rewind.

25. A system for encrypting data packets in a multimedia stream, each data packet comprising a header portion and a payload portion, the system comprising:
   a key server; and
   a transmitting unit communicatively connected to the key server; wherein the transmitting unit comprises a processor, memory coupled to the processor, and a multimedia stream encryption engine stored in the memory and executed using the processor to:
      select one or more data packets from an incoming multimedia stream;
      select a header portion and/or a payload portion associated with each of the one or more selected data packets;
   obtain one or more encryption keys from the key server;
   encrypt a part of the selected header portion and/or a part of the selected payload portion associated with each of the one or more selected data packets using the one or more encryption keys;
   add a custom stream to the multimedia stream, wherein the multimedia stream encryption engine is to embed the packets associated with the custom stream at regular intervals to indicate the usage of encryption algorithm and the usage of KI associated with the encryption keys, and wherein each packet associated with the custom stream include a flag to indicate a random access point in the multimedia stream; and
   embed encryption information associated with the encrypted part of the header portion and/or the payload portion in packets associated with the custom stream to enable decryption by a receiving unit, wherein the encryption information comprises start of the encrypted part of the selected header portion and/or the selected payload portion, size of the encrypted part of the selected header portion and/or the selected payload portion, and an encryption algorithm and key information (KI) associated with encryption keys used to encrypt the part of the selected header portion and/or the selected payload portion.

26. The system of claim 25, wherein each flag in the packets associated with the custom stream is used to perform trick mode operations during playback, wherein the trick mode operations are selected from the group consisting of seek, fast forward, and rewind.

* * * * *